United States Patent

Friedrichsen et al.

Patent Number: 5,605,208
Date of Patent: Feb. 25, 1997

[54] ROTARY DAMPER

[75] Inventors: Bernd Friedrichsen; Werner Janoschek, both of Norderstedt, Germany

[73] Assignee: ITW Ateco GmbH, Norderstedt, Germany

[21] Appl. No.: 587,778

[22] Filed: Dec. 26, 1995

[30] Foreign Application Priority Data

Dec. 23, 1994 [DE] Germany .............. 9420646 U

[51] Int. Cl.$^6$ .............. F16F 7/02; F16F 7/04
[52] U.S. Cl. .............. 188/130; 188/381; 188/166; 188/83; 16/354
[58] Field of Search .............. 188/130, 129, 188/381, 83, 18 A, 251 A, 251 M, 71.1, 166, 723, 290; 267/196–216; 16/337–341, 347, 356; 74/474, 531

[56] References Cited

U.S. PATENT DOCUMENTS

| | | | |
|---|---|---|---|
| 916,528 | 3/1909 | Broome | 188/130 |
| 1,088,450 | 2/1914 | Richards | 188/130 |
| 1,121,012 | 12/1914 | Hartford | 188/130 |
| 1,128,782 | 2/1915 | Hartford | 188/130 |
| 1,177,876 | 4/1916 | Laporte | 267/201 |
| 1,372,327 | 3/1921 | Young | 267/215 |
| 1,499,179 | 6/1924 | Mastrangel | 188/130 |
| 1,515,716 | 11/1924 | Adams | 188/130 |
| 1,685,497 | 9/1928 | Martin | 188/130 |
| 1,808,700 | 6/1931 | Wendell | 188/130 |
| 1,892,966 | 1/1933 | Rouanet | 188/130 |
| 2,149,374 | 3/1939 | Wellman | 188/130 |
| 2,445,607 | 7/1948 | DeGhetto | 188/83 |
| 2,560,015 | 7/1951 | Waldron | 188/83 |
| 2,763,338 | 9/1956 | Kime | 188/130 |
| 3,028,619 | 4/1962 | Schlage et al. | 188/130 |
| 4,189,424 | 2/1980 | Takamatsu | 188/251 A |
| 4,415,069 | 11/1983 | Eisemann | 16/337 |
| 4,463,933 | 8/1984 | Schreyer et al. | 188/83 |
| 4,691,589 | 9/1987 | Arakawa | 74/574 |
| 4,833,938 | 5/1989 | Reinwall et al. | 188/130 |
| 4,836,607 | 6/1989 | Klüting | 188/130 |
| 4,893,522 | 1/1990 | Arakawa | 188/290 |
| 4,938,322 | 7/1990 | Sugasawara et al. | 188/290 |
| 5,211,267 | 5/1993 | Clark | 188/290 |
| 5,269,397 | 12/1993 | Kawamoto et al. | 188/290 |
| 5,460,248 | 10/1995 | Korb et al. | 188/83 |

FOREIGN PATENT DOCUMENTS

| | | | |
|---|---|---|---|
| 0593810 | 4/1994 | European Pat. Off. . | |
| 1262603 | 3/1960 | France | 188/130 |
| 3320069 | 12/1983 | Germany . | |
| 8404656 | 5/1984 | Germany . | |
| 3605185 | 8/1986 | Germany . | |
| 3929753 | 1/1991 | Germany . | |
| 4315294 | 11/1993 | Germany . | |
| 4323095 | 10/1994 | Germany . | |
| 330956 | 10/1935 | Italy | 188/130 |
| 63-167136 | 7/1988 | Japan . | |

*Primary Examiner*—Douglas C. Butler
*Attorney, Agent, or Firm*—Schwartz & Weinrieb

[57] ABSTRACT

A rotary damper comprises a housing, a disc-shaped rotor which is supported within the housing so as to be rotatably and axially displaced in the housing, the rotor including an axially aligned annular friction surface which coacts with a coaxial annular friction surface inside the housing, and a spring within the housing which axially presses the rotor against the friction surface of the housing.

20 Claims, 1 Drawing Sheet

ROTARY DAMPER

FIELD OF THE INVENTION

The invention relates generally to damper mechanisms, and more particularly to a rotary damper which is operatively associated with spring-biased components.

BACKGROUND OF THE INVENTION

It has become known to provide any parts pretensioned by springs, for instance inside a motorcar, with a suitable damping means. This, for example, concerns lids of glove compartments or ashtrays, or supporting straps or the like. Usually, any flaps, lids or drawers are pretensioned by springs in the opening direction. Supporting straps, however, are pretensioned into the position of rest. In all cases, however, there is a risk that, when released, the parts are accelerated at high speed due to the pretension of the spring, for which reason undesired noises are produced as soon as the parts encounter their associated abutment. Besides, frequent abutting of the parts may impair the suspension or bearing structure and cause damage thereto in the course of time. Any appropriate damping means, thus ensures that the movement of the parts caused by a spring takes place in a damped manner. It has become known to use so-called oil dampers for damping means of that kind.

Usually, oil dampers are rotary dampers, with at least one disc-shaped rotor being supported within an area of a housing which is filled with a suitable fluid damping medium, such as silicone oil. Due to the relatively high viscosity of the damping medium, the attempt to rotate the rotor results in the generation of a countermoment or resistance which may be used for damping purposes. Rotary and oil dampers of that kind, for instance, have become known from the DE 33 20 069 or DE 36 05 185 publications. More particularly, a pinion is arranged on the axis of the rotor which pinion coacts with a line-shaped toothed segment which is secured to the element to be damped.

Rotary dampers of this kind can be constructed so as to have a very small size and they function most efficiently. However, they also have certain disadvantages. Depositing the liquid damping medium into the housings of the dampers involves a relatively high expense. The damping fluid naturally must be retained in the housing so that the latter needs to be provided with corresponding seals. This is why the damper will be relatively expensive as well. Moreover, the damping fluid naturally is temperature-dependent. Different temperatures result in a different volume. In the DE 33 20 069 publication, it is therefore also suggested to arrange within the damping area a flexible membrane which gives way in case of an increase in volume of the damping medium in order to increase the volume for accomodations the damping fluid. Any variations of temperature, however, also result in different viscosities and, consequently, a different torque.

OBJECT OF THE INVENTION

It therefore is the object of the invention to provide a rotary damper which does not have the above-mentioned disadvantages and which, at the same time, generates an effective damping moment.

SUMMARY OF THE INVENTION

The structure of the inventive rotary damper is relatively similar to that of the so-called oil dampers. Damping according to the invention, however, does not make use of the viscosity of a liquid medium but is a function of the friction of the rotor developed in connection with a frictional surface of the housing. For this purpose, the rotor is supported in the housing so as to be allowed a limited axial displacement and is pressed against the frictioned surface of the housing with the aid of a spring. The desired damping moment is generated by choosing a suitable material for the friction surfaces.

The rotary damper according to the invention comprises numerous advantages. Special sealing measures on the housing or on the rotor axis are not necessary. Filling the housing with a damping medium is also not required, as a result of which the production of the inventive rotary damper involves substantially less expense. The inventive rotary damper is also relatively independent of temperature and, in spite of the different ambient temperature, generates an approximately constant braking moment.

The inventive rotary damper can also be provided with different braking moments in case of any given configuration and size. The braking moment can be specifically adjusted to desired values by choosing another spring, by changing the thickness of the rotor, by choosing another material having another coefficient of friction or by changing the sizes of the friction surfaces.

If the housing is composed of a suitable material, the friction surface of the housing may be formed of the housing material itself. According to a preferred embodiment of the invention, the friction surface of the housing is defined by a separate disc-shaped member of a suitable frictions material which, for instance, is silicone or a comparable elastomeric material. To prevent the friction disc from rotating as well, it can be secured to the housing so as to ensure the necessary disposition.

According to a development of the invention, a cup-shaped spring may be provided as a spring member acting upon the rotor, which spring, according to a further development of the invention, is corrugated in the circumferential direction. Cup-shaped springs of that kind are known per se. Preferably, the radially inner side portion of the spring engages the rotor, while the radially outer side portion is supported by the wall of the housing. This is especially advantageous if the wall of the housing is defined by a lid which positively engages a groove of the housing. In this way, the wall of the housing or the lid is prevented from being more or less deformed outwardly as a result of the axial pressure of the spring.

According to a further development of the invention, the housing is pot-shaped and, as mentioned, can be closed by a lid, with a shaft portion of the rotor extending through a central bore of the lid. The lid may be provided with a radial extension which is positively received by within an inner annular groove of the housing. During assembly the lid is simply pressed into the pot-shaped housing, with the housing or the lid getting slightly deformed temporarily, until the radial extension engages the groove. A construction of that kind also allows the rotary damper to be easily disassembled.

To be able to ensure an approximately central bearing support of the rotor, according to a further development of the invention, there is provided a supporting trunnion which is molded upon the wall of the housing including the friction surface, which supporting trunnion engages a central bearing recess of the rotor. The bearing recess must be deep enough to allow axial movement of the rotor.

BRIEF DESCRIPTION OF THE DRAWINGS

The invention will be more fully explained hereinafter by means of the following detailed description which is to be

DESCRIPTION OF THE PREFERRED EMBODIMENT

Figure 1:
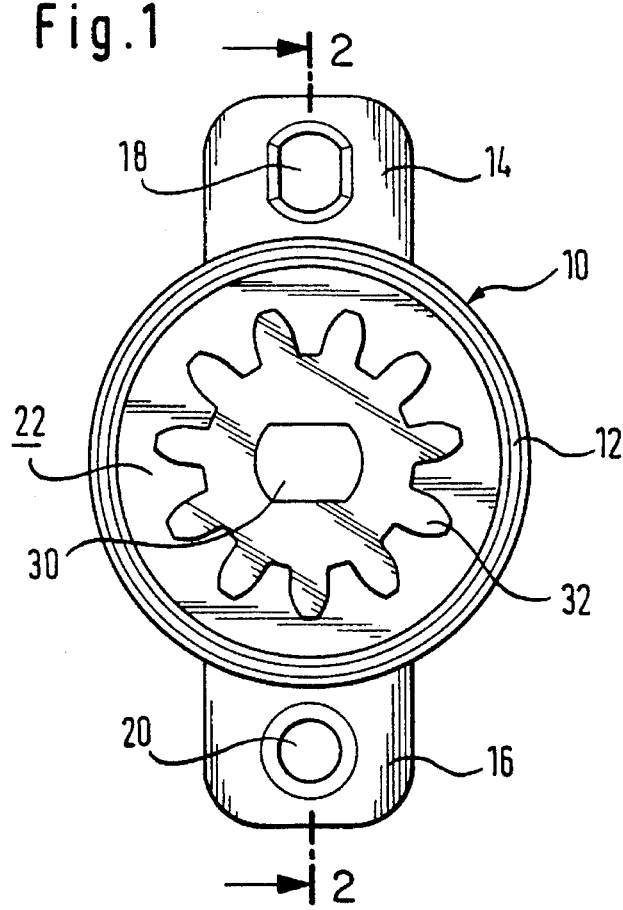
FIG. 1 is a side view of a rotary damper according to the invention.
Figure 2:
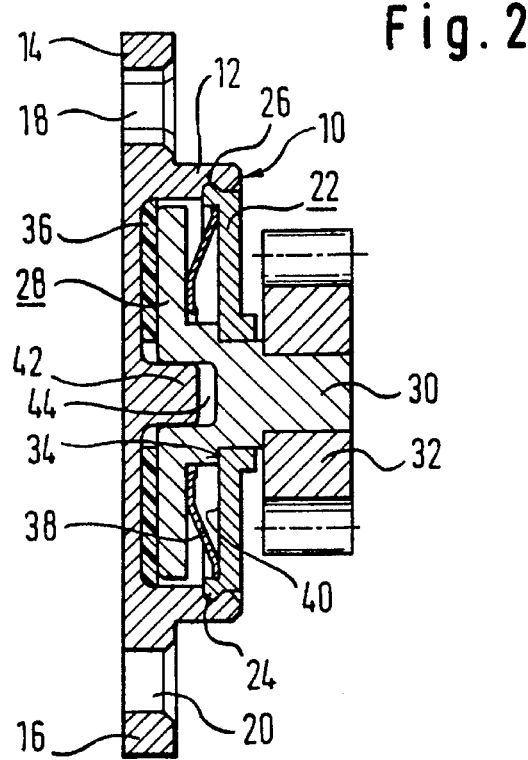
FIG. 2 is a section through the damper according to FIG. 1 along line 2-2.

FIGS. 1 and 2 show a housing 10 of a rotary damper which comprises a pot-shaped portion 12 including flat projections 14, 16 at opposite sides thereof, which projections are provided with apertures 18, 20 for securing them to a base. The open side of the pot-shaped portion 12 can be closed by a lid 22 which comprises a circumferentially extending annular extension 24 which engages a correspondingly formed annular groove 26 of the housing portion 12. During assembly the lid 22 is pressed into portion 12, whereby both parts are temporarily deformed, until the annular extension 24 engages the groove 26. Within the housing 10 a disc-shaped rotor 28 is arranged, on which a shaft portion 30 is molded which with a smaller diameter portion extends through a central bore of the lid 22. On the shaft portion 30 a pinion 32 is provided which coacts with a corresponding tooth portion of a movable element, such as a trunk lid, an ashtray or the like.

The rotor 28 is supported by the lid 22 by means of a shoulder 34. On the opposite side the rotor 28 is supported by a friction surface 36 which engages the associated wall of the housing and can be secured to the latter in a suitable way. A cup spring 38 is matingly accommodated within a recess 40 of the lid 22 so as to be supported by the rotor 28 and the lid 22. Support of the cup spring 38 by the lid 22 is made with its radially outer circumference, while the radially inner circumference engages the rotor 28 so that only relatively low friction is caused when moving the rotor disc 28.

A supporting trunnion 42 molded upon a central portion of the wall of the housing 12 engages a central cylindrical bearing recess 44 formed within the rotor 28.

The rotor disc 28 can move in the axial direction, possibly with minimum clearance, but is permanenty pressed against the friction surface 36 by means of the spring 38. The frictional surface 36 is composed of a suitable frictional material, such as silicone rubber or the like. Rotary movement of the rotor 28 thus causes a braking moment of a given value. The braking moment naturally may be varied by the tension of the spring 38, by the selection of a corresponding material having another coefficient of friction or the like without having to change the fundamental structure of the rotary damper described above.

The illustrated parts of the rotary damper, except the spring 38, may be made of a suitable synthetic material, for instance by injection molding. The disc 36 may be omitted in case the material of the housing 10 has corresponding frictional properties. The friction thus takes place between the rotor 28 and the wall of the housing facing the rotor.

Obviously, many modifications and variations of the present invention are possible in light of the above teachings. It is therefore to be understood that within the scope of the appended claims, the present invention may be practiced otherwise than as specifically described herein.

We claim:

1. A rotary damper, comprising:

a housing having a substantially cup-shaped configuration comprising a closed end wall, an annular side wall, and an open end disposed opposite said closed end wall;

friction means disposed within said housing upon said end wall;

cover means mounted upon said housing for closing said open end of said housing;

a rotor rotatably mounted within said housing and disposed in contact with said friction means for generating a friction damping force as said rotor rotates with respect to said housing and said friction means disposed within said housing; and spring means disposed within said housing so as to be interposed between and in contact with said cover means and said rotor for biasing said rotor into contact with said friction means.

2. A damper as set forth in claim 1, wherein:

said friction means comprising a frictional component fixedly secured within said housing.

3. A damper as set forth in claim 2, wherein:

said frictional component is fabricated from silicone.

4. A damper as set forth in claim 1, wherein:

said friction means comprises a surface integral with said housing against which said rotor is biased by said spring means.

5. A damper as set forth in claim 1, wherein:

said friction means comprises an annular disc member disposed about an axis of said damper;

said rotor comprises an annular portion coaxially disposed with respect to said annular friction disc member and said axis of said damper; and said spring means axially biases said annular portion of said rotor into contact with said annular friction disc member.

6. A damper as set forth in claim 5, further comprising:

a trunnion member coaxially disposed within and integrally formed with said housing; and recess means defined within said rotor for accommodating said trunnion member of said housing so as to rotatably mount said rotor within said housing.

7. A damper as set forth in claim 1, wherein:

said spring means comprises an annular cup-shaped spring member having an inner peripheral portion engaged with said rotor and an outer peripheral portion engaged with said housing.

8. A damper as set forth in claim 7, wherein:

said cover means has a substantially cup-shaped configuration defining an open-ended recess so as to accommodate said outer peripheral portion of said spring means.

9. A damper as set forth in claim 8, wherein:

said housing has an annular groove formed within a peripheral sidewall portion thereof; and said cover means has an annular rib disposed within said annular groove of said housing so as to permit said cover means to be snap-fittingly engaged upon said housing.

10. A damper as set forth in claim 8, wherein:

said cover means has an aperture formed within a central axial portion thereof; and said rotor comprises a shaft portion integral therewith and extending axially through said aperture of said cover means so as to extend outwardly of said housing.

11. A damper as set forth in claim 10, further comprising:

pinion means fixedly mounted upon a distal end portion of said shaft portion of said rotor for engaging a rotary member of a component whose rotary movement is to be damped by said damper.

12. A rotary damper, comprising:

a housing a closed end wall and an open end disposed opposite said closed end wall;

a rotor, having a surface portion thereof disposed toward said closed end wall of said housing, rotatably mounted within said housing;

cover means mounted upon said housing for closing said open end of said housing;

friction means interposed between said closed end wall of said housing and said surface portion of said rotor, disposed toward said closed end wall of said housing, for impressing frictional damping forces upon said rotor as said rotor rotates relative to said housing; and spring means disposed within said housing so as to be interposed between and in contact with said cover means and said rotor for biasing said rotor toward said closed end wall of said housing so as to develop frictional damping forces upon said rotor by said friction means as said rotor rotates with respect to said housing.

13. A damper as set forth in claim 12, wherein:

said cover means is substantially cup-shaped so as to define a recessed portion therein; and said spring means comprises an annular cup-shaped spring member having an inner peripheral portion engaged with said rotor and an outer peripheral portion engaged within said recessed portion of said cover means.

14. A damper as set forth in claim 12, wherein:

said friction means comprises a frictional component fixedly secured within said housing.

15. A damper as set forth in claim 12, wherein:

said friction means comprises a surface integral with said housing against which said rotor is biased by said spring means.

16. A damper as set forth in claim 12, wherein:

said friction means comprises an annular disc member disposed about an axis of said damper;

said rotor comprises an annular portion coaxially disposed with respect to said annular friction disc member and said axis of said damper; and said spring means axially biases said annular portion of said rotor, which comprises said surface portion, into contact with said annular friction disc member.

17. A rotary damper, comprising:

a housing having a closed end wall and an open end disposed opposite said closed end wall;

a rotor, having a surface portion thereof disposed toward said closed end wall of said housing, rotatably mounted within said housing;

cover means mounted upon said housing for closing said open end of said housing;

friction means fixedly disposed upon one of said closed end wall of said housing and said surportion of said rotor, disposed toward said closed end wall of said housing, for developing frictional damping forces between said rotor and said housing as said rotor rotates relative to said housing; and spring means disposed within said housing so as to be interposed between and in contact with said cover means and said rotor for biasing said surface portion of said rotor toward said closed end wall of said housing such that said friction means, disposed upon said one of said closed end wall of said housing and said surface portion of said rotor, will develop said frictional damping forces upon said rotor as said friction means engages the other one of said closed end wall of said housing and said surface portion of said rotor as said rotor rotates relative to said housing.

18. A damper as set forth in claim 17, wherein:

said friction means comprises a frictional component fixedly secured upon said end wall of said housing.

19. A damper as set forth in claim 17, wherein:

said friction means comprises a surface integral with said end wall of said housing against which said surface portion of said rotor is biased by said spring means.

20. A damper as set forth in claim 17, wherein:

said friction means comprises and annular disc member disposed about an axis of said damper;

said rotor comprises an annular portion, comprising said surface portion, coaxially disposed with respect to said annular friction disc member and said axis of said damper; and said spring means axially biases said annular portion of said rotor, comprising said surface portion, into contact with said annular friction disc member.

* * * * *